United States Patent
Traut et al.

(10) Patent No.: US 7,313,793 B2
(45) Date of Patent: Dec. 25, 2007

(54) METHOD FOR FORKING OR MIGRATING A VIRTUAL MACHINE

(75) Inventors: Eric P. Traut, San Carlos, CA (US); Rene A. Vega, Scotts Valley, CA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 10/193,531

(22) Filed: Jul. 11, 2002

(65) Prior Publication Data
US 2004/0010787 A1  Jan. 15, 2004

(51) Int. Cl.
*G06F 9/455* (2006.01)

(52) U.S. Cl. ............................. 718/1; 709/201; 711/6; 711/165

(58) Field of Classification Search .................... 718/1, 718/100–108; 711/1–6, 100–173, 200–221; 709/200–253, 310–332; 703/1–28
See application file for complete search history.

(56) References Cited

U.S. PATENT DOCUMENTS

| | | | |
|---|---|---|---|
| 5,313,647 A * | 5/1994 | Kaufman et al. | 718/102 |
| 6,704,764 B1 * | 3/2004 | Ottati | 718/100 |
| 6,732,220 B2 * | 5/2004 | Babaian et al. | 711/6 |
| 6,802,062 B1 * | 10/2004 | Oyamada et al. | 718/1 |
| 6,850,953 B1 * | 2/2005 | Deshpande et al. | 707/103 Y |
| 7,093,086 B1 * | 8/2006 | van Rietschote | 711/161 |
| 2002/0029308 A1 * | 3/2002 | Babaian et al. | 710/240 |
| 2003/0033344 A1 * | 2/2003 | Abbott et al. | 709/1 |

OTHER PUBLICATIONS

U.S. Appl. No. 10/109,406, filed Mar. 28, 2002.*
Kozuch, Michael et al. "Efficient State Transfer for Internet Suspend/Resume." Intel Corporation. May 2002.*
Casas, Jeremy et al. "MPVM: A Migration Tranparent Version of PVM." Department of Computer Science and Engineering, Oregon Graduate Institute of Science & Technology. Feb. 1995.*
Kozuch, Michael et al. "Internet Suspend/Resume." Intel Corporation. Apr. 2002.*
Sapuntzakis, Constantine et al. "Optimizing the Migration of Virtual Computers." Dec. 2002.

* cited by examiner

*Primary Examiner*—Lewis A. Bullock, Jr.
(74) *Attorney, Agent, or Firm*—Woodcock Washburn LLP

(57) ABSTRACT

A method is provided for increasing the efficiency of virtual machine processing. A parent virtual machine is provided on a host computer. The parent virtual machine is temporarily or permanently suspended. A child virtual machine is created at a new location by forking the parent virtual machine. The child virtual machine may not initially include all the stored data that is associated with the parent virtual machine.

47 Claims, 5 Drawing Sheets

METHOD FOR FORKING OR MIGRATING A VIRTUAL MACHINE

TECHNICAL FIELD OF THE INVENTION

The present invention relates in general to the field of virtual machines and, more particularly, to a method for applying the concepts of forking and migration to virtual machines.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its functionality by having more rather than fewer applications run on the microprocessor family associated with the computer manufacturer's product line. To expand the number of operating systems and application programs that can run on a computer system, a field of technology has developed in which a given computer having one type of CPU, called a host, will run an emulator program that allows the host computer to emulate receiving and executing the instructions of an unrelated type of CPU, called a guest. Thus, the host computer will execute an application that will cause one or more host instructions to be called in response to a given guest instruction. In some cases, the host computer can both run software designed for its own hardware architecture, other than the emulation program, and software written for computers having an unrelated hardware architecture. As a more specific example, a computer system manufactured by Apple Computer, for example, may run operating systems and programs written for PC-based computer systems. It may also be possible to use an emulator program to concurrently operate multiple incompatible operating systems on a single CPU. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the guest computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

One advantage of a virtual machine over a real machine is the ability to quickly and cheaply create multiple instances of virtual machines. If allowed by the virtual machine implementation, multiple virtual machines can exist simultaneously in a single host machine (host computer system) environment. Resources of the host machine can be divided among the various virtual machines. For example, a single host machine with four processors and 1 gigabyte of random access memory (RAM) could be divided evenly into four virtual machines, each of which is given one processor and 256 megabytes of RAM. Other resource allocation divisions are possible.

This flexible resource allocation becomes even more useful when combined with the ability to move virtual machines from one host machine to another. This allows for "load balancing" of systems. For example, if a virtual machine requires more processing power than is available on one host machine, it can be moved to another host machine that has extra capacity.

In some computing environments, it is useful to have multiple machines that are nearly identical in configuration (both hardware and software). For example, a large electronic-commerce web site such as Amazon.com has dozens or hundreds of web servers that are all nearly identical in configuration. This setup allows for easy expandability. When current capacity is inadequate, additional servers can quickly be brought on line.

Another case where nearly-identical configurations are useful is in the testing of configuration modifications. When dealing with mission-critical applications, IS managers often want to test software configuration changes before applying them to the production system. For example, if a new "security patch" was made available by Microsoft Corporation for the Windows operating system, an administrator may want to test this patch on a separate server machine before installing the patch on the production server.

SUMMARY OF THE INVENTION

The present invention in one implementation provides a method for increasing the efficiency of virtual machine processing. One step of the method is providing a parent virtual machine. Another step is temporarily suspending the parent virtual machine. Another step is forking the parent virtual machine to create a child virtual machine at a new location.

The present invention provides another method for increasing the efficiency of virtual machine processing. One step of the method is providing a parent virtual machine that is associated with stored data. Another step of the method is temporarily suspending the parent virtual machine. Another step is forking the parent virtual machine to create a child virtual machine at a new location without at least a first portion of the stored data.

Further, the present invention provides another method for increasing the efficiency of virtual machine processing. One step of the method is providing a parent virtual machine that is associated with stored data. Another step of the method is permanently suspending the parent virtual machine. Another step is migrating the parent virtual machine to create a child virtual machine at a new location without at least a first portion of the stored data.

An advantage of one implementation of the present invention is that it makes possible the forking of a virtual machine. The ability to fork increases the utility of the aforementioned multiple instances of virtual machines. Forking can, in some circumstances, create multiple instances quickly enough that most functions of and applications running on the virtual machines are not affected significantly.

Another advantage of an implementation of the present invention is that it increases the efficiency of virtual machine processing.

One implementation of the method of the present invention has the advantage of a forking time unaffected by the size of the parent virtual machine's memory. When the non-memory portion of the parent virtual machine consists of only a few hundred kilobytes of data, the forking time is about a millisecond on some systems.

If demand paging is added to the method, then total execution time may also depend on the size of the parent's memory. However, demand paging does not cause conflicts with the applications running on the parent and child virtual machines.

No one of the preceding advantages is critical to the invention. Particular implementations of the invention may achieve only a subset of the advantages. For example, one implementation of the invention may only provide the option of forking a virtual machine. Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
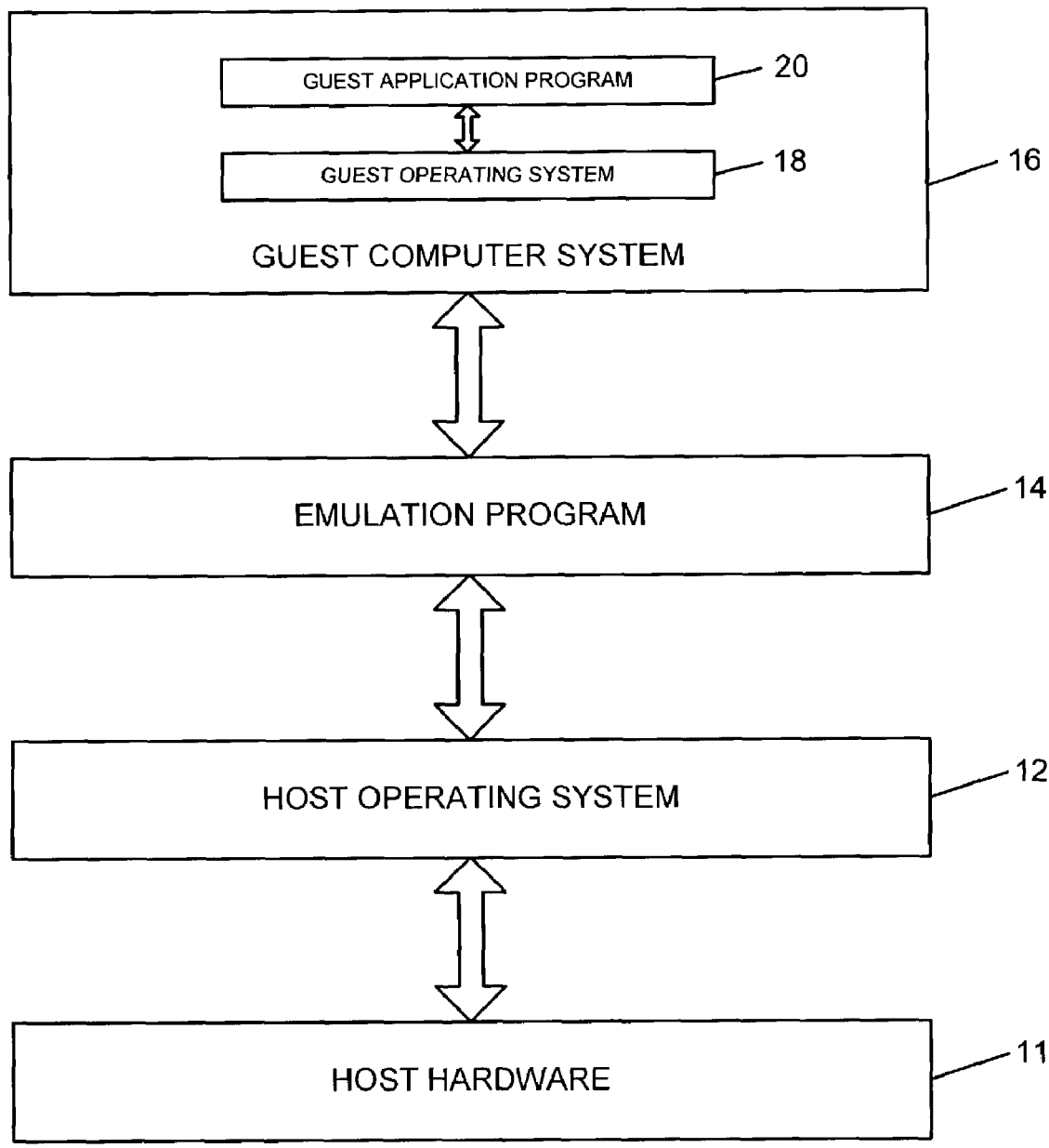
FIG. 1 is a diagram of the logical relationship of the elements of an emulated computer system running in a host computer system.

In the case of an emulated computer system or virtual machine, an emulation program provides an emulated operating environment in the host computer system. Shown in FIG. 1 is a diagram of the logical layers of the hardware and software architecture for an emulated operating environment in a computer system 10. An emulation program 14 runs on a host operating system that executes on the host computer system hardware or processor 11. Emulation program 14 emulates a guest computer system 16, including a guest operating system 18. Guest application programs are able to execute on guest operating system 18. In the emulated operating environment of FIG. 1, because of the operation of emulation program 14, guest application 20 can run on the computer system 10 even though guest application 20 is designed to run on an operating system that is generally incompatible with host operating system 12 and host computer system hardware 11.

Figure 2:
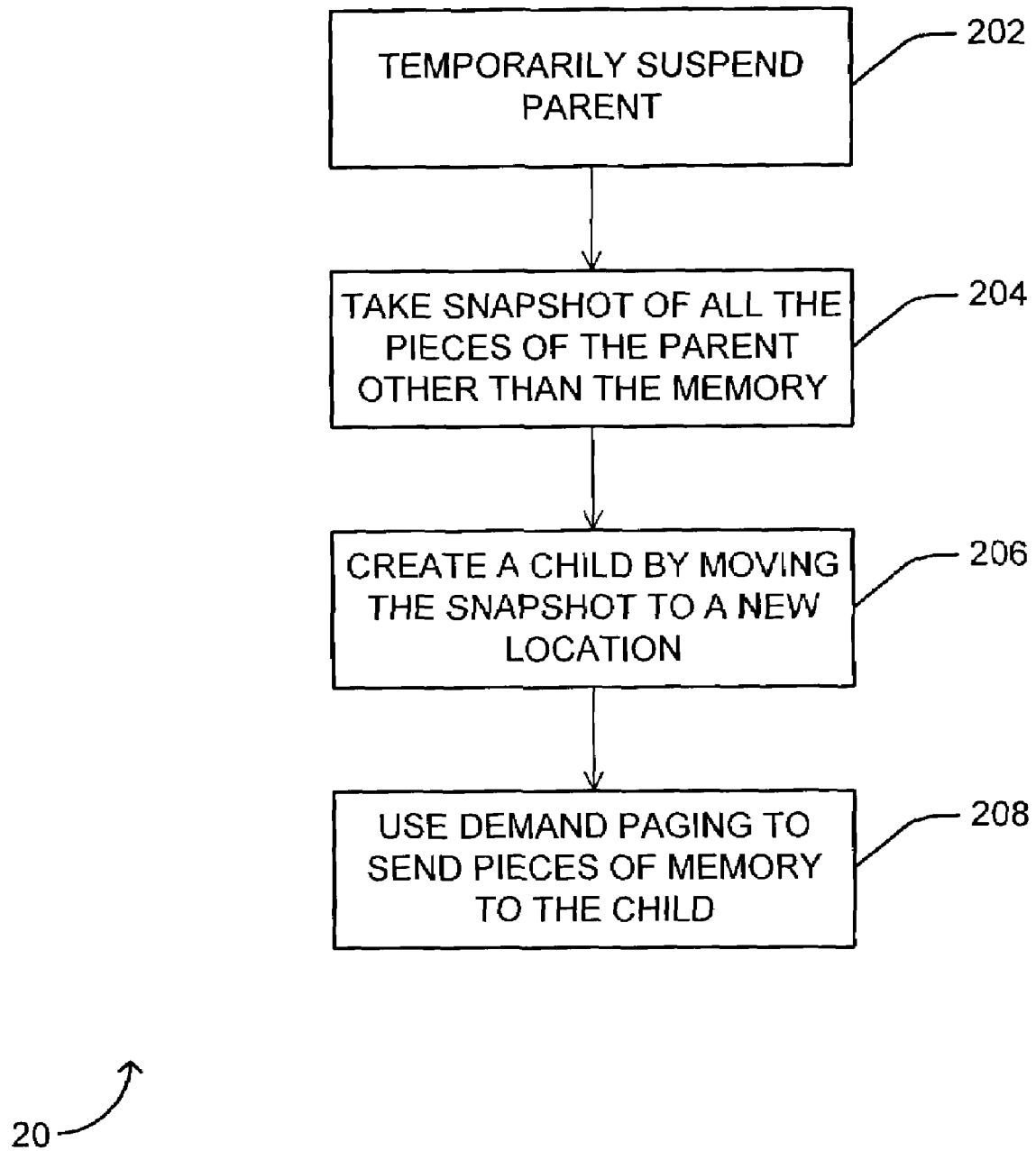
FIG. 2 is a flow diagram of a method for forking a virtual machine.
Figure 3:
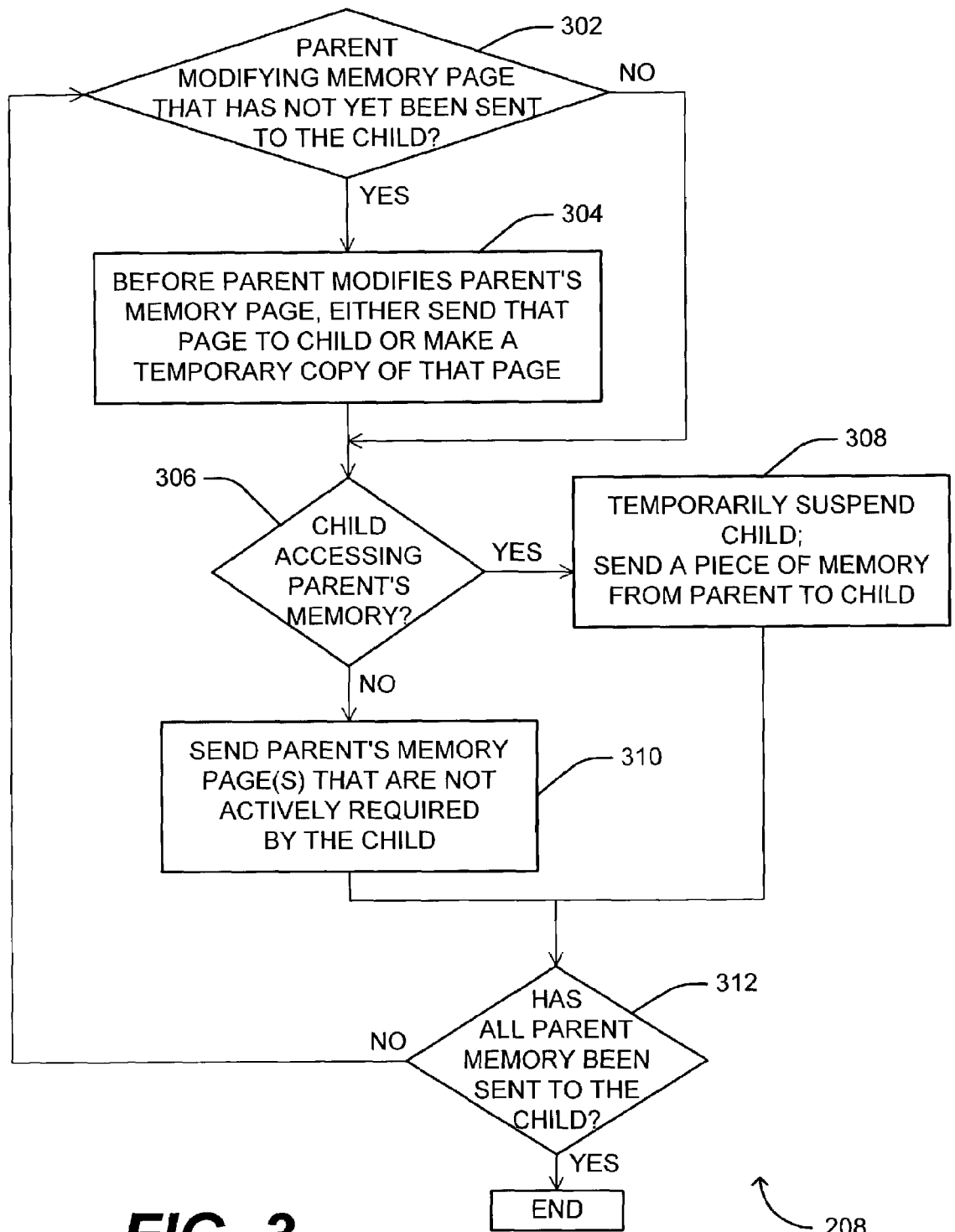
FIG. 3 is a flow diagram of demand paging used in forking a virtual machine.

Referring now to FIGS. 2 and 3, "forking" is a term used by UNIX programmers to describe the duplication of a UNIX process and its address space. Both the original process and the fork are then allowed to run as independent processes from the forking point. The implementation of forking often involves a technique called "copy on write" in which case all memory pages in both address spaces are marked "write protected". When either the original or the forked process writes to a page, a copy is made so that each process has its own copy. Pages that are not modified can continue to be shared between the two processes. This technique not only saves on memory resources, but it also makes forking much faster than otherwise possible.

In the present invention, the concept of forking a single process is combined with the concept of a virtual machine. The present invention allows for fast conversion of shared resources to private copies between an original virtual machine and its fork. However, resource sharing is possible only if both virtual machines are running on the same host.

Virtual machine forking can be used to quickly replicate an existing virtual machine. For example, if a user wants to test a new patch, he can fork the virtual machine and apply the patch to the non-production fork. Once the patch has been tested, it can be applied to the original copy with limited risk. Alternatively, the production and non-production virtual machines could be swapped once the testing of the patch was completed.

Shown in FIG. 2 is a flow diagram of a method 20 for forking a virtual machine. In step 202, a virtual machine parent is suspended. In step 204, a copy or "snapshot" is made of all of the pieces of the parent virtual machine other than the memory of the parent virtual machine. In step 206, the snapshot is moved to a new location, i.e. a location other than the location of the parent. Moving the snapshot to a new location creates a new virtual machine child. The child may or may not be located on the same host computer system as the parent. In step 208, pieces of the parent's memory are sent to the child using demand paging. Demand paging, depicted in FIG. 3, is a method for sending pieces or pages of memory from the parent to the child. In demand paging, parent memory is prioritized based on what the child actively requires.

FIG. 3 is a flow diagram of the demand paging of step 208 used in forking a virtual machine. In step 302, it is determined whether or not the parent virtual machine is about to modify a piece of the parent's memory that has not yet been sent to the child. If the parent virtual machine is about to modify a memory piece, in step 304, then before the parent is allowed to modify the memory piece, either the piece is sent to the child virtual machine or a temporary copy of the piece is made. The temporary copy is saved by the parent until a later, as-yet-undetermined point in the demand paging method, at which point the copy is sent to the child. If the parent is not about to modify a memory piece or if step 304 is completed, the method proceeds to step 306.

In step 306, it is determined whether or not the child virtual machine is accessing the memory of the parent virtual machine. If the child is accessing the parent's memory, in step 308, the child virtual machine is temporarily suspended and the piece of the parent's memory required by the child is sent from the parent to the child. If the child is not accessing the parent's memory, in step 310, pieces of the parent's memory that are not actively required by the child may be sent from the parent to the child. If step 308 or step 310 is completed, the method proceeds to step 312.

In step 312, it is determined whether or not all of the memory of the parent virtual machine has been sent to the child virtual machine. If not all of the memory has been sent, the method proceeds to step 302, described above. If all of the memory has been sent, then the demand paging method ends.

Figure 4:
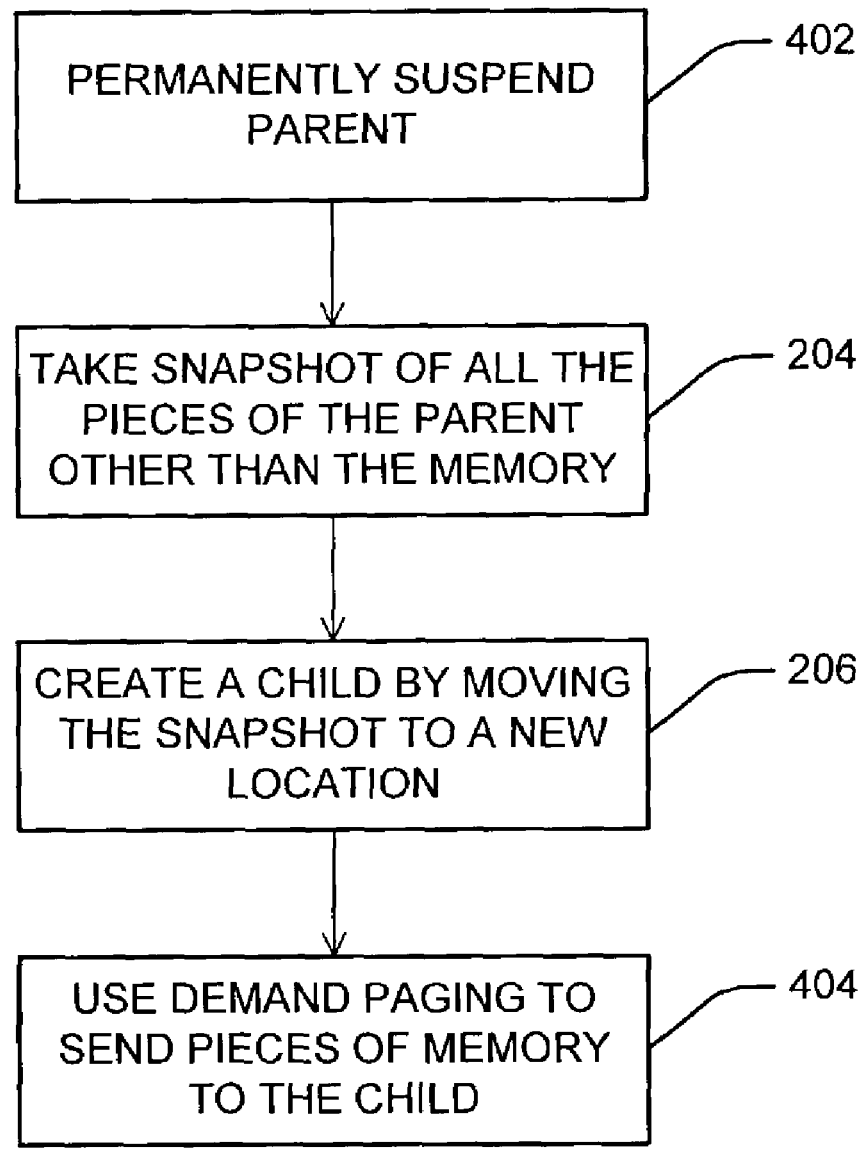
FIG. 4 is a flow diagram of a method for migrating a virtual machine.
Figure 5:
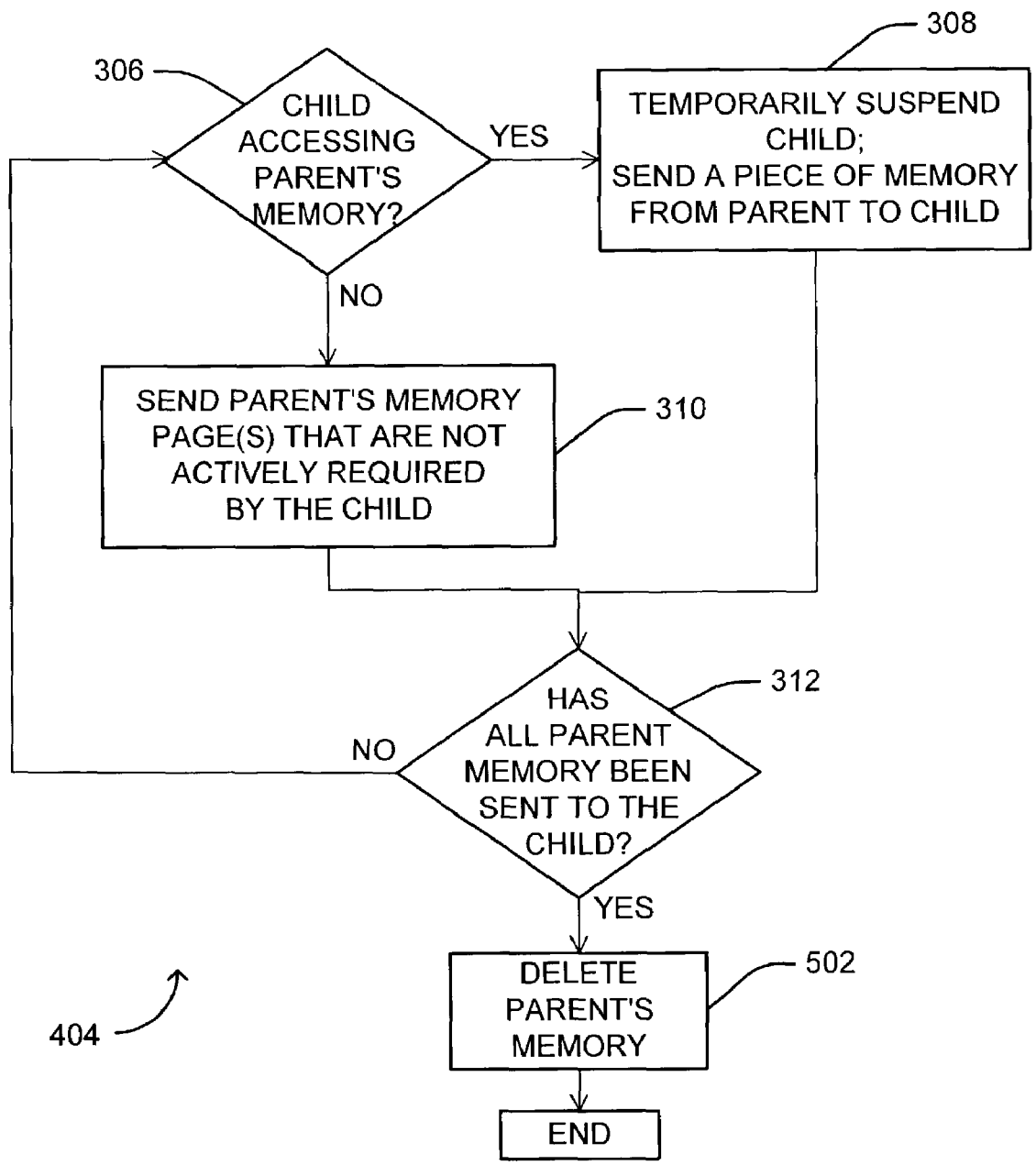
FIG. 5 is a flow diagram of demand paging used in migrating a virtual machine.

Referring now to FIGS. 4 and 5, "migrating" is a term that refers to the movement of a virtual machine from one host machine to another. When a virtual machine is migrated, the original virtual machine is permanently suspended; and the copy runs in a new location. One way to implement migration involves saving the entire state of the virtual machine (including all of its RAM) to a file on disk, then copying the file to the new host and restoring the machine state.

In the present invention, migrating is similar to forking in its implementation. As with a forked virtual machine, a migrated virtual machine can start running almost immediately after it is created, i.e. within a second or two after creation. This feature results from the use of demand paging and "copy-on-access," wherein copy-on-access is defined as the copying of parent's memory to the child upon the child's accessing the parent's memory. Copy-on-access is an aspect of demand paging for migrating a virtual machine.

Copy-on-access is also an advantage of the present invention over existing technologies. Existing technologies save and restore an entire copy of the parent's Random Access Memory (RAM). Existing technologies' saving and restoring can take anywhere from 5 to 60 seconds, depending on the size of the memory allocated to the parent One application of migrating a virtual machine is load balancing. Another application would be for fail-over or hardware maintenance. For example, if the hardware in the host machine requires maintenance (e.g. more memory is to be added), the virtual machine can be temporarily migrated to a backup machine, preventing downtime.

Shown in FIG. 4 is a flow diagram of a method 40 for migrating a virtual machine. In step 402, a parent virtual machine is permanently suspended. In step 204, a copy or "snapshot" is made of all of the pieces of the parent virtual machine other than the memory of the parent virtual machine. In step 206, the snapshot is moved to a new location, i.e. a location other than the location of the parent. Moving the snapshot to a new location creates a child virtual machine. The child may or may not be located on the same computer system as the parent. In step 404, pieces of the parent's memory are sent to the child using demand paging. Demand paging, depicted in FIG. 5, is a method for sending pieces or pages of memory from the parent to the child. In demand paging, parent memory is prioritized based on what the child actively requires.

FIG. 5 is a flow diagram of the demand paging of step 404 used in migrating a virtual machine. In step 306, it is determined whether or not the child virtual machine is accessing the memory of the parent virtual machine. If the child is accessing the parent's memory, in step 308, the child virtual machine is temporarily suspended and the piece of the parent's memory required by the child is sent from the parent to the child. If the child is not accessing the parent's memory, in step 310, pieces of the parent's memory that are not actively required by the child may be sent from the parent to the child. If step 308 or step 310 is completed, the method proceeds to step 312.

In step 312, it is determined whether or not all of the memory of the parent virtual machine has been sent to the child virtual machine. If not all of the memory has been sent, the method proceeds to step 306, described above. If all of the memory has been sent, the method proceeds to step 502. In step 502, the parent's memory is deleted. After step 502, the demand paging method ends.

The present invention is not limited in its application to the emulation of a particular computer system architecture, particularly the Intel 80X86 architecture.

Although the present invention has been described in detail, it should be understood that various changes, substitutions, and alterations can be made thereto without departing from the spirit and scope of the invention as defined by the appended claims.

What is claimed is:

1. A method for virtual machine processing, comprising the steps of:
    providing on a first host system a parent virtual machine configured to host a guest operating system, the parent virtual machine comprising a software environment that appears as a hardware computer to the guest operating system hosted by the parent virtual machine;
    suspending the parent virtual machine;
    forking or migrating the parent virtual machine to create at least one child virtual machine at an at least one new location, where the forked or migrated child virtual machine comprises an incomplete copy of the parent virtual machine that begins executing as a virtual machine; and
    copying portions of the parent virtual machine to the child virtual machine as such portions are needed for execution of the parent virtual machine or are needed for execution of the child virtual machine.

2. The method of claim 1, wherein the at least one new location is on the first host computer system.

3. The method of claim 1, wherein the at least one new location is on a second host computer system.

4. The method of claim 1, wherein the parent virtual machine is a network server.

5. A method for virtual machine processing, comprising the steps of:
providing on a first host system a parent virtual machine comprised of stored data, where the parent virtual machine comprises a software environment configured to be capable of hosting a guest operating system;
forking or migrating the parent virtual machine to create at least one child virtual machine at an at least one new location without a first portion of the stored data, where the child virtual machine comprises an operational incomplete copy of the parent virtual machine lacking the first portion of the stored data of the parent virtual machine;
executing the parent virtual machine while executing the incomplete child virtual machine that is missing the first portion of stored data of the parent virtual machine; and
copying subportions of the first portion from the operating parent virtual machine to the operating child virtual machine as such subportions are needed by the parent virtual machine or copying subportions from the operating parent virtual machine as such subportions are needed by the child virtual machine.

6. The method of claim 5, wherein the at least one new location is on the first host computer system.

7. The method of claim 5, wherein the at least one new location is on a second host computer system.

8. The method of claim 5, wherein the child virtual machine, when forked, hosts a copy of at least a portion of a guest operating system hosted by the forked parent virtual machine, and wherein the guest operating system can begin executing in the child virtual machine that lacks the first portion of the stored data of the parent virtual machine.

9. The method of claim 5, further comprising the step of:
using demand paging to send subportions of the first portion of the stored data to the at least one child virtual machine.

10. The method of claim 9, wherein the step of using demand paging comprises the step of:
if the at least one child virtual machine is accessing a first subportion of the first portion, temporarily suspending the at least one child virtual machine and sending the first subportion to the at least one child virtual machine.

11. The method of claim 10, wherein the step of using demand paging further comprises the step of:
if not all of the first portion of the stored data associated with the parent virtual machine has been sent to the at least one child virtual machine, sending a second subportion of the first portion to the at least one child virtual machine.

12. The method of claim 9, wherein the step of using demand paging comprises the step of:
if the at least one child virtual machine is not accessing the at least one memory of the parent virtual machine, sending memory pages of the first portion to the at least one child virtual machine.

13. The method of claim 9, wherein the step of using demand paging comprises the step of:
if the parent virtual machine attempts to modify a first subportion, sending the first subportion to the at least one child virtual machine before the first subportion is modified by the parent virtual machine.

14. The method of claim 13, wherein the step of using demand paging further comprises the step of:
if not all of the first portion of the stored data associated with the parent virtual machine has been sent to the at least one child virtual machine, sending a second subportion of the first portion to the at least one child virtual machine.

15. The method of claim 9, wherein the step of using demand paging comprises the step of:
if the parent virtual machine attempts to modify a first subportion, making a copy of the first subportion before the first subportion is modified by the parent virtual machine.

16. The method of claim 15, wherein the copy of the first subportion is a temporary copy.

17. The method of claim 15, wherein the step of using demand paging further comprises the step of:
if not all of the first portion of the stored data associated with the parent virtual machine has been sent to the at least one child virtual machine, sending a second subportion of the first portion to the at least one child virtual machine.

18. The method of claim 5, wherein the first portion comprises memory of the parent virtual machine.

19. A method for virtual machine processing where there resides on a first host system a first virtual machine comprising stored data, where the first virtual machine is configured to be capable of hosting a guest operating system, the first virtual machine comprising a software environment that a guest operating system interacts with as though it were a physical hardware computer hosting the guest operating system, the method comprising:
migrating the first virtual machine to create a second virtual machine by copying pages from memory of the executing first virtual machine to memory of the second virtual machine while the first virtual machine is executing, where the memory of the first virtual machine from which the pages are copied is memory that is available for reading or writing by the first virtual machine during and for execution of the first virtual machine.

20. The method of claim 19, wherein the second virtual machine is on a second host computer system.

21. The method of claim 19, wherein the second virtual machine is on the first host computer system.

22. The method of claim 19, wherein a portion of the first virtual machine is copied for the second virtual machine while the first virtual machine is suspended.

23. The method of claim 19, wherein some of the pages copied from the memory of the first virtual machine are copied as part of a process for iteratively copying inactive pages.

24. The method of claim 23, wherein a portion of the first virtual machine is copied for the second virtual machine while the first virtual machine is suspended.

25. The method of claim 19, further comprising copying memory pages of the first virtual machine for the second virtual machine using a copy-on-demand algorithm.

26. One or more computer readable media storing information for enabling a computer to perform a process of forking or migrating a parent virtual machine to create a child virtual machine, where the parent and child virtual machines comprise software environments that function as virtual hardware computers capable of hosting respective guest operating systems on a same host computer, the process comprising:
forking or migrating the parent virtual machine to create the child virtual machine by taking a partial snapshot of the parent virtual machine and using the partial snapshot for the child virtual machine, the partial snapshot comprising a portion of the parent virtual machine that does not include a portion of memory of the parent virtual machine;

copying, from the parent virtual machine for the child virtual machine, subportions of the portion of memory responsive to corresponding determinations that such subportions of the memory are to be modified by the parent virtual machine; and executing the child virtual machine without the portion of memory of the parent virtual machine.

27. One or more computer readable media configured according to claim 26, the process further comprising copying first subportions of the portion of memory from the parent virtual machine to the child virtual machine responsive to corresponding determinations that such first subportions of the portion of memory are required by execution of the child virtual machine.

28. One or more computer readable media configured according to claim 26, wherein the snapshot is taken while the parent virtual machine is suspended, and wherein the process further comprises copying subportions of the portion of memory from the parent virtual machine for the child virtual machine as such portions are required for writing-to by the parent virtual machine and/or as such portions are required to be accessed by the executing of the child virtual machine.

29. One or more computer readable media configured according to claim 26, wherein the child virtual machine is on a computer other than a computer hosting the parent virtual machine.

30. A host computer configured to host a virtual machine managing unit, the virtual machine managing unit configured to manage a plurality of virtual machine environments that execute concurrently on the host computer and each of which are capable of hosting an arbitrary operating system such that arbitrary operating systems can execute concurrently on the host computer, where the host computer is further configured to allow duplicating of a first one of the virtual machines by taking a snapshot of the first virtual machine, using the snapshot as a basis for a second virtual machine, and copying portions of the first virtual machine from the first virtual machine to the second virtual machine when such portions are to be written-to by the first virtual machine.

31. A host computer according to claim 30, wherein some portions are copied when they are to be written-to by the first virtual machine and those portions are either sent to the second virtual machine before the first virtual machine writes to the portions or are copied temporarily before the first virtual machine writes to them and the temporary copies are sent to the second virtual machine.

32. One or more computer readable media storing information to allow a computer to perform a process of forking a parent virtual machine, where the parent virtual machine is a type of virtual machine where multiple instances thereof enable respective operating systems to operate concurrently on a same host computer, the process comprising:

copying portions of an operational parent virtual machine to an operational child virtual machine forked from the parent virtual machine, where the forked child virtual machine is operational as a virtual machine, where the operational forked child virtual machine comprises an incomplete copy of the parent virtual machine missing at least the portions before they are copied to the child virtual machine, and where the portions are copied from the parent virtual machine to the child virtual machine while the parent virtual machine and child virtual machine are operational.

33. One or more computer readable media storing information according to claim 32, wherein the portions are copied as they are needed by the parent virtual machine and/or are needed by the forked child virtual machine.

34. One or more computer readable media storing information according to claim 32, wherein one of the portions is needed by the parent virtual machine when the parent virtual machine is to modify the portion, and the portion is copied for the child virtual machine before the parent virtual machine modifies the portion.

35. One or more computer readable media storing information according to claim 32, wherein the portions comprise memory pages of the parent virtual machine.

36. One or more computer readable media storing information according to claim 32, wherein one of the portions is needed by the incomplete operational child virtual machine when the incomplete operational child virtual machine needs to access the portion, and, responsive to the need for the portion by the child virtual machine, the portion is copied to the child virtual machine.

37. One or more computer readable media storing information according to claim 36, wherein when the child virtual machine needs to access the portion the child virtual machine is suspended until it receives the copied portion.

38. One or more computer readable media storing information according to claim 32, further comprising:

stopping the parent virtual machine while creating the child virtual machine; and pausing the operational child virtual machine while waiting for at least some of the portions to be copied in response to their being needed by the child virtual machine.

39. One or more computer readable media storing information according to claim 38, further comprising resuming the stopped parent virtual machine.

40. A method of migrating a virtual machine of a type that appears as a hardware computer to a guest operating system hosted thereby, the method comprising:

copying some pages of the virtual machine from a source computer to a virtual machine on the target computer while the guest operating system is executing on the virtual machine on the source computer, the virtual machine on the target computer comprising an incomplete copy of the virtual machine on the source computer; and copying other pages of the virtual machine from the source computer to the virtual machine on the target computer while the virtual machine is stopped on the source computer, where the source computer and the target computer each include respective virtual machine managers for managing respective pluralities of virtual machines including the migrating virtual machine.

41. A method of migrating a virtual machine of a type that appears as a hardware computer to a guest operating system hosted thereby, the method comprising:

copying some pages of the virtual machine from a source computer to a virtual machine on a target computer while the guest operating system is executing on the virtual machine on the source computer, the virtual machine on the target computer comprising an incomplete copy of the virtual machine on the source computer, wherein the some of the pages are copied based on their not having been copied to the target computer; and copying other pages of the virtual machine from the source computer to the virtual machine on the target computer while the virtual machine is stopped on the source computer, where the source computer and the target computer each include respective virtual machine managers for managing respective pluralities of virtual machines including the migrating virtual machine.

42. A method of migrating a virtual machine of a type that appears as a hardware computer to a guest operating system hosted thereby, the method comprising:

copying some pages of the virtual machine from a source computer to a virtual machine on the target computer while the guest operating system is executing on the virtual machine on the source computer, wherein the some of the pages are copied based on their being needed on the target computer; and copying other pages of the virtual machine from the source computer to the virtual machine on the target computer while the virtual machine is stopped on the source computer, where the source computer and the target computer each include respective virtual machine managers for managing respective pluralities of virtual machines including the migrating virtual machine.

43. A method of migrating a virtual machine of a type that appears as a hardware computer to a guest operating system hosted thereby, the method comprising:

copying some pages of the virtual machine from a source computer to a virtual machine on a target computer while the guest operating system is executing on the virtual machine on the source computer, wherein the some of the pages are copied based on their being needed on the source computer; and copying other pages of the virtual machine from the source computer to the virtual machine on the target computer while the virtual machine is stopped on the source computer, where the source computer and the target computer each include respective virtual machine managers for managing respective pluralities of virtual machines including the migrating virtual machine.

44. A method for creating a second virtual machine from a first virtual machine, where the first virtual machine includes an operating system hosted thereon, the method comprising;

copying portions of memory of the first virtual machine to the second virtual machine while the operating system is executing in the first virtual machine, where the copying of the portions of the first virtual machine is performed in response to detecting that they are needed for the second virtual machine.

45. The method of claim 44, the method further comprising:

sending copies of some of the portions after they have been written to the second virtual machine.

46. A host computer configured to host a virtual machine managing unit, the virtual machine managing unit configured to manage a plurality of virtual machine environments that execute concurrently on the host computer and each of which are capable of hosting an arbitrary operating system such that arbitrary operating systems can execute concurrently on the host computer, where the host computer is further configured to allow duplicating of one of the virtual machines by taking a snapshot of the first virtual machine, using the snapshot as a basis for a second virtual machine, and copying portions of the first virtual machine from the first virtual machine to the second virtual machine when such portions are accessed by a child virtual machine.

47. A method for creating a second virtual machine from a first virtual machine, where the first virtual machine is configured to be capable of hosting an operating system hosted thereon, the method comprising:

copying portions of memory of the first virtual machine for the second virtual machine while the first virtual machine is executing, where the copying of the portions of the virtual machine is performed in response to determinations that they are needed by the first virtual machine.

* * * * *